2,832,688
REMOVAL OF EXCESS COLOR BODIES IN FRUIT JUICES

Hsing T. Huang, Elkins Park, Pa., and Carl V. Smythe, Moorestown, N. J., assignors to Rohm & Haas Company, Philadelphia, Pa., a corporation of Delaware No Drawing. Application August 12, 1954
Serial No. 449,512

6 Claims. (Cl. 99—106)

This invention deals with a method for decreasing the content of color bodies in fruit juices and wines. It comprises treating fruit juice or wine with an enzyme preparation containing an anthocyanase.

Berry fruits owe their characteristic and familiar red, blue, or purple color to cell sap pigments, highly active coloring matters which vary in color or shade with the pH of their environment and their metal salt form. These pigments have been shown to be 2-phenylbenzopyrylium derivatives, for the most part being methoxy or hydroxy compounds occurring in the plant as glucosides or galactosides.

When berry fruits are crushed or pressed, these pigments pass into the juice which forms. In many cases this is desirable. In some instances the amount of pigment in the juice is in excess of that required to impart the desired color and appearance. It is thus commonly observed with blackberry wines, grape juice, and other intensely colored juices that there is a gradual separation of excess pigment. This results in precipitates or unsightly sediments at the bottom, sides, or neck of the container. This sedimentation is usually a slow process which takes place during processing and storage which is influenced by original pigment concentration and also time, temperature, and frequently the nature of the container.

When excess pigment results in cloudiness, precipitation, or plating out on glass container surfaces, the consumer is apt to refuse or reject the product. This results in an economic loss.

Color bodies sometimes cause cloudiness in fruit juices and wines from the combination with metallic salts and also from combination with chlorophyll, yielding unattractive greenish derivatives. Both of these factors have been shown to reduce brilliance and vividity of color.

Excess color bodies have been found to depolarize and remove hydrogen from exposed iron surfaces of uncoated or improperly coated metal containers. This increases the rate of solution of the metal with corrosion and pitting resulting. It is usually accompanied by the development of dark specks in the juice.

There is another situation where the presence of colored pigments is objectionable even though these may be relatively low in amount. In some grape growing areas (particularly in California) white varieties of grapes are difficult to cultivate. It is, therefore, a practice in many wineries to use the free run juice from some red skinned varieties of grapes in the production of white wines. To permit this use the grapes are picked before the development of full color so that the pigment content of the free run juice will be low or negligible. Time of picking becomes important and somewhat critical, since grapes which are too young will lack the desired concentration of sugars and preferred flavor qualities and those which are mature will impart too much color to the free run juice. It thus becomes desirable to be able to use grapes which have reached a proper stage of maturity and to remove any objectionable color which may then appear in the free run juice.

Attempts have been made to stabilize colored juices and wines where sedimentation, development of cloudiness, and corrosion occur. Proposed methods have involved the use of chemicals, heat, or modifications in processing or the blending of juices of different characteristics. All of the previously proposed methods have suffered from serious limitations. This has been in part because of the inherent sensitivity of the products to changes in aroma and flavor and in part because of restrictions imposed by pure food laws. Consequently, as far as we can determine, the food industry lacks a simple, effective, legally permissible method to remove excess color bodies.

According to the process of this invention undesired color bodies are removed from fruit juices and wine by treating them with an anthocyanase. This is done by adding an enzyme preparation containing an anthocyanase to fruit juice or to must and permitting it to act on color bodies therein. When the required action on these bodies has been carried to a desired point, clear juice and sediment are separated. If it is desired to destroy or inactivate any anthocyanase remaining in treated juice, it can be heated to an inactivating temperature, usually above 150° F., for a time sufficient to accomplish this purpose at the temperature selected. Pasteurization at temperatures from 150° F. to 190° F. can produce the desired effect provided the juice or wine is held in this range for a finite time.

Anthocyanases have been identified in plants and have been found to be elaborated by bacteria and fungi. The exact source of an anthocyanase is not critical. A preferred source of this type of enzyme is from fungi. As in the elaboration of all types of enzymes, it has been found that strains can be found which are particularly favorable for producing in their growth cycle active preparations of anthocyanases. Strains may be selected from *Aspergillus niger, Aspergillus parasiticus, Aspergillus oryzae, Aspergillus fumigatus, Penicillium javanicum,* or *Penicillium chrysogenum,* and the like fungi. The most active preparations are obtained by growing the fungi in media containing nutrients, including polysaccharides, as adapted to the specific strains. After growth of the organism has taken place on a nutrient medium, the active enzyme system is extracted and separated in conventional ways. When the method of preparation of the enzyme system and of its use in fruit juices have been properly carried out, the nature of the enzyme is such that its use in wine or juice is not apparent except insofar as the finished products exhibit improved color characteristics.

The enzyme is used under controlled conditions of temperature, time, concentration, and acidity. The most suitable range of temperature is from about 60° F. to 105° F. At lower temperatures the enzyme action is still evident, but rather slow. At higher temperatures enzyme action is at least initially more rapid, but the enzyme soon becomes inactive.

The length of time of action required at any given temperature will depend on the initial concentrations of enzyme and plant pigment.

The concentration of anthocyanase is adjusted to meet requirements, taking into account the time and temperature used in the process. Where only small proportions of color bodies are to be removed, the amount of enzyme used may, of course, be relatively small. Where there are present rather large concentrations of color bodies and these are in excess of the amount needed to impart desired color to the juice or wine, wide variations may be made in concentration of enzyme, particularly as its action can be stopped at any desired density of color.

Normally fruit juices have a suitable pH at which the anthocyanases can act. A pH range of about 3 to 4.5 is generally suitable.

The point in the processing of a fruit juice at which addition of anthocyanase is to be made is open to considerable variation. Such enzyme may be added to the fruit before crushing, to the crushed fruit, to the juice as first obtained, or to the juice at a later time, even just prior to the final filtration or finishing operation. Addition can be made in conjunction with other processing steps.

The anthocyanase causes an enzymatic hydrolysis of anthocyanin to anthocyanidin and sugar. Since anthocyanidin is much less soluble than the original pigment, it tends to precipitate from the solution. The low concentration of anthocyanidin in solution is spontaneously transformed into colorless derivatives. The precipitate can be filtered off or settled out followed by decanting or siphoning.

Preparation of an active anthocyanase will now be described.

PREPARATION A

A growth medium consisting of 2 parts of wheat bran, 4 parts of middlings and 7 parts of water is inoculated with a spore suspension of a selected strain of *Aspergillus niger* grown on damp oat hulls and then incubated at 30° C. for 70–80 hours until abundant mycelial growth is obtained. The whole culture is dried thoroughly in air, ground to a fine powder, and then extracted with twice its weight of water. The aqueous extract is cooled to 0° C. and ethanol at about 5° C. is added with stirring until the final ethanol concentration is approximately 87%. This mixture is allowed to stand for several hours. The precipitate is collected by centrifugation and dried in air. The enzyme preparation so obtained is very stable and can be kept at room temperature for many months without any deterioration of anthocyanase activity.

Typical processes for removing unwanted color are shown in the following illustrative examples.

Example 1

Mature grapes of the Grenache variety (balling at 20–22° F.) are crushed and stemmed. Addition of sulfur dioxide is made to 100 p. p. m. After 24 hours the free-run juice is drawn into the fermenation tank. A pure wine yeast culture is added and also there is added and stirred into the juice one pound of the above enzyme preparation per 100 gallons of juice. Fermentation is carried out in the usual way. During this time the added enzyme hydrolyzes the anthocyanins which have been extracted from the skins. When fermenation is complete, the wine is treated in the usual manner. The wine is rough filtered to remove sedimentary material and aged. It may then be fined and pasteurized at 140° F.

The product is a white wine having considerable body, excellent bouquet and aroma, and good flavor.

Example 2

Thawed blackberries are placed in a fermentation tank. There are added sulfur dioxide at 100 p. p. m. and one pound of the above anthocyanase preparation per 100 gallons. A pure yeast starter of the Champagne or Burgundy strain is added. Fermentation is allowed to proceed at temperatures not exceeding 80° F. After about four days of fermentation the contents of the tank are aerated. After fermentation has ceased (the wine need not be fermented dry), the wine is drawn and the pomace is pressed. The wine is pasteurized at 165° F.

This blackberry wine contains less anthocyanin than untreated wines, as can be observed from color density measurements, although to the visual observer it still appears to be rich in color and brilliancy. When this wine is stored in bottles, sedimentation of pigment and plating out of color bodies on the glass fail to occur.

Example 3

Grapes of the Mission variety are crushed. Thereto are added sulfur dioxide at 100 p. p. m. and one pound of a commercial pectic enzyme per ton of grapes. This enzyme acts upon the pomace and permits rapid and fairly complete drainage of juice from the pomace. The juice is drawn off and treated with a pure yeast culture and with one pound of the above anthocyanase per 100 gallons of juice. Fermentation occurs and is continued until the wine has the correct sugar level for Angelica dessert wine. Fermentation is arrested by adding brandy to bring the alcohol content to 21%. The resulting Angelica wine contains less anthocyanin than untreated wines.

Example 4

Mature Concord grapes are stemmed and crushed and heated to 140°–145° F. When it is judged that sufficient flavoring and coloring material have been solubilized, the hot grape mass is drained in "cheese" layers and then pressed. Free-run juice and expressed juice are combined and treated at about 90° F. with one pound per 100 gallons of the above anthocyanase preparation and with two ounces per 100 gallons of a good pectic enzyme, such as Pectinol 100D. The juice is left standing for about 16 hours and then is cooled and held at 40°–45° F. for three days. During this time pigment sediment settles out with the crude argols. Clear juice is siphoned off, filtered, pasteurized, and bottled. This grape juice on prolonged storage shows no sedimentation, whereas similar juice not treated as above does.

By treating juice or wine with an anthocyanase as has been described unwanted color bodies can be removed. The process makes possible the stabilizing of juices and wines which have heretofore been noted for containing an excess of color bodies. The process also makes possible in the preparation of white wines the use of free-run juice from grapes which would at proper maturity impart color.

We claim:

1. The process of removing excess color bodies in fruit juices and wines which comprises adding to fruit juices and wines containing excess color pigments an enzyme preparation containing an anthocyanase, permitting said anthocyanase to act on said excess color pigments, and separating clear juices and wines having a reduced content of color pigments.

2. The process of removing excess color bodies from fruit juices which comprises adding to fruit juices containing excess color pigments an anthocyanase, permitting said anthocyanase to act on said color pigments at a temperature between about 60° F. and 105° F., and separating clear juice having a reduced content of color pigments.

3. The process of removing excess color bodies from blackberry juice which comprises adding to blackberry juice an anthocyanase, permitting the anthocyanase to act on the color pigments in said juice until the excess color pigments have yielded a sediment, and separating clear juice and sediment.

4. The process of removing excess color bodies from grape juice which comprises adding to grape juice an anthocyanase, permitting the anthocyanase to act on the color bodies in said juice until the excess thereof has yielded a sediment, and separating clear juice and sediment.

5. In the process of preparing fruit juices and wines wherein fruit is crushed and the juice therefrom is taken with an excess of color bodies the improvement which comprises supplying to the juice an anthocyanase and permitting the anthocyanase to act on said excess until a desired color density is reached.

6. In the process of making white wines from grapes which supply color bodies the improvement which comprises adding to juice from said grapes an anthocyanase and permitting said anthocyanase to act on color bodies therein.

References Cited in the file of this patent

UNITED STATES PATENTS

| | | |
|---|---|---|
| Re. 15,776 | Gusmer | Feb. 26, 1924 |
| 1,932,833 | Willaman | Oct. 31, 1933 |